United States Patent
Kemp et al.

(10) Patent No.: US 12,503,029 B1
(45) Date of Patent: Dec. 23, 2025

(54) HYDRAULIC LIFT SYSTEM FOR A SEMI-TRAILER

(71) Applicant: Clement Industries, Inc., Minden, LA (US)

(72) Inventors: Kenneth K. Kemp, Summerfield, LA (US); Griffin Schlamp, Ruston, LA (US); Robert Horton, Bossier City, LA (US); Gregory N. Leong, Murfreesboro, TN (US)

(73) Assignee: Clement Industries, Inc., Minden, LA (US)

( * ) Notice: Subject to any disclaimer, the term of this patent is extended or adjusted under 35 U.S.C. 154(b) by 711 days.

(21) Appl. No.: 17/887,243

(22) Filed: Aug. 12, 2022

(51) Int. Cl.
*B60P 1/16* (2006.01)
*B60P 1/18* (2006.01)

(52) U.S. Cl.
CPC ............ *B60P 1/162* (2013.01); *B60P 1/18* (2013.01)

(58) Field of Classification Search
CPC .. B60P 1/162; B60P 1/283; B60P 1/16; B60P 1/045; B60P 1/28; B60P 1/165; B60P 1/04; B60P 1/34; B60P 1/60; F15B 15/16; F15B 2211/329; B60G 2202/413; B60G 2300/04; B60G 2300/02; B60G 2400/60
USPC .......................................................... 298/22
See application file for complete search history.

(56) References Cited

U.S. PATENT DOCUMENTS

| | | | | |
|---|---|---|---|---|
| 2,861,837 A | * | 11/1958 | Morse ..................... | B60P 1/18 298/17 S |
| 4,865,341 A | * | 9/1989 | Hicks ..................... | B62D 53/068 414/475 |
| 4,954,039 A | * | 9/1990 | Johnston ................ | B62D 53/0821 414/500 |
| 5,184,872 A | * | 2/1993 | Larochelle ............. | B60P 1/18 414/483 |
| 5,758,927 A | * | 6/1998 | Koester .................. | B60P 1/16 298/22 AE |

OTHER PUBLICATIONS

Trunnion Mount vs Telescopic Dump Bed for Dump Trucks; youtube.com video; https://www.youtube.com/watch?v=G1fzXEooJU4; Addicted2Dump Trucks; accessed May 6, 2025, published Jul. 1, 2019. (Year: 2019).*
Reliance Trailer; Reliance Heavy Duty Trailers, End Dumps, 2017, https://www.reliancetrailer.com/assets/reliancetrailer/image/enddumps/.
Reliance Trailer, https://www.reliancetrailer.com/assets/reliancetrailer/image/enddumps/005_2A.jpg, 2017.

* cited by examiner

*Primary Examiner* — Amy R Weisberg
*Assistant Examiner* — Philip Charles Adams
(74) *Attorney, Agent, or Firm* — C. Brandon Browning; Maynard Nexsen PC

(57) ABSTRACT

A hydraulic lift system for a semi-trailer is provided. The hydraulic lift system includes a single, vertically-mounted, double acting, telescopic hydraulic cylinder located at the front of the semi-trailer. One portion of the hydraulic cylinder can be attached to bearings that are bolted to a vertical support structure attached to the longitudinal beams of the semi-trailer. The rod end of the hydraulic cylinder can be attached to the kingpin plate and draft arms of the semi-trailer. The hydraulic cylinder can be extended to lift the longitudinal beams of the semi-trailer to a position for the dumping of the contents of a container on the semi-trailer or for loading or unloading a container from the semi-trailer.

13 Claims, 8 Drawing Sheets

HYDRAULIC LIFT SYSTEM FOR A SEMI-TRAILER

BACKGROUND

The present application generally relates to a hydraulic lift system for a semi-trailer. More specifically, the present application is directed to a hydraulic lift system with a single, double-acting, telescopic lift cylinder located at the front of the semi-trailer to raise the front of the semi-trailer to either load or unload a container carried by the semi-trailer and/or to dump the contents of a container carried by the semi-trailer.

A semi-trailer can be pulled by a corresponding tractor unit (or truck) and can be used for transporting items, such as containers, between locations. One type of large container for holding debris, waste and/or other items from a jobsite or other location can be called a "roll-off." A particular type of semi-trailer used to transport a roll-off can be called a roll-off trailer. The roll-off trailer can be used to deliver an empty roll-off to a jobsite. The roll-off can then be unloaded from the roll-off trailer at the jobsite and filled with debris and waste from the jobsite. Once the roll-off has been filled, a roll-off trailer can return to the jobsite to load the filled roll-off onto the roll-off trailer. The roll-off trailer can then transport the filled roll-off to an appropriate facility for disposal of the debris and waste in the roll-off by dumping the contents of the roll-off.

A typical roll-off trailer can have two double-acting, telescopic hydraulic cylinders to move the roll-off trailer between a travel position and the loading/unloading (or dumping) position. An example of a prior roll-off trailer with 2 cylinders is shown in FIGS. 1-3. The base end of each of the hydraulic cylinders 101 in the prior roll-off trailer can be attached to a cross-structural member 106 with a single pin 105 and the rod end of each of the hydraulic cylinders 101 in the prior roll-off trailer can be attached to the kingpin plate 102 and draft arms 111 with a cross-shaft 104. When in the travel position, the two cylinders 101 can be positioned in a substantially horizontal (or semi-horizontal) position (e.g., the base end and the rod end of each cylinder 101 can be positioned such that a longitudinal axis of the cylinder 101 has an angle less than 15° relative to the ground).

To transition the prior roll-off trailer between the travel position (as shown in FIGS. 1 and 2) and the loading/unloading (or dumping) position (as shown in FIG. 3), hydraulic force can be applied to the cylinders 101 to extend the base ends of the cylinders 101 away from the rod ends of the cylinders 101. When hydraulic pressure (e.g., from hydraulic fluid) is provided to the rod end of both cylinders 101, the hydraulic pressure extends the cylinders 101 and separates the kingpin plate 102 from the longitudinal members or beams 114 that provide support to the roll-off. The draft arms 111 that can be a pivot point for the prior roll-off trailer are pinned between the kingpin plate 102 at one end and a location near a midpoint of the longitudinal beams 114 at the other end. The draft arms 111 can assist in keeping the longitudinal beams 114 parallel with each other and in keeping the prior roll-off trailer connected with the tractor unit (not shown in FIGS. 1-3). The hydraulic force through the rod ends of the cylinders 101 extends the cylinders 101 and lifts the roll-off (not shown in FIGS. 1-3) on the longitudinal members or beams 114 to a loading/unloading (or dumping) position. When the cylinders 101 have been fully extended and the roll-off has been loaded, unloaded or dumped, a control valve can be operated to switch the application of hydraulic pressure to the base ends of the cylinders 101 to compress the cylinders 101 and lower the prior roll-off trailer back to a travel position.

One drawback to the prior roll-off trailer is that the generally horizontal position of the cylinders in the travel positions results in a small lever arm relative to the longitudinal arms (and roll-off), thereby requiring a greater force area for the amount of pressure needed to lift the longitudinal arms (and roll-off). The need for a greater force area to lift the roll-off results in the need for larger cylinders and a correspondingly larger hydraulic pressure source, which can increase both the costs to use and weight of a roll-off trailer. Thus, what is needed is a lighter and more cost-effective way for lifting the longitudinal arms (and roll-off) of a roll-off trailer.

SUMMARY

The present application is directed to a system for a roll-off trailer to dump and/or load/unload a roll-off. More specifically, the present application is related to a hydraulic lift system for a roll-off trailer that has a single, double-acting, telescopic lift cylinder located at the front of the roll-off trailer near the tractor (or truck). The lift cylinder can be positioned in a substantially vertical position and use hydraulic force to lift longitudinal members or beams of a roll-off trailer to a load/unload or dump position.

The hydraulic lift system for the roll-off trailer includes a cylinder mounting structure rigidly fastened to the two longitudinally extending beams of the roll-off trailer. The cylinder mounting structure can be fastened to the two longitudinal beams at a position that is located over the kingpin plate for the roll-off trailer. A hydraulic lift cylinder can be substantially vertically mounted in the cylinder mounting structure. When mounted in the cylinder mounting structure, one portion of the hydraulic lift cylinder can be connected to the cylinder mounting structure with a trunnion-style connection and another portion of the hydraulic lift cylinder is rigidly connected to the kingpin plate and the draft arms of the roll-off trailer. The connection of the hydraulic lift cylinder to the cylinder mounting structure with the trunnion-style connection enables the hydraulic lift cylinder to pivot with respect to the cylinder mounting structure.

The substantially vertically positioned hydraulic lift cylinder can be raised with hydraulic force to lift the ends of the longitudinal beams, and any load (e.g., a roll-off) carried by the longitudinal beams, to a proper angle needed to either dump the contents of the roll-off (or other container box) or to load/unload the roll-off (or other container box). The substantially vertical orientation of the hydraulic lift cylinder provides for a large lever arm, thereby reducing the force area for the amount of pressure needed to lift the longitudinal arms (and roll-off).

One advantage of the present application is weight and cost saving from using a single hydraulic cylinder to raise and lower the longitudinal arms of a roll-off trailer.

Another advantage of the present application is the use of corresponding mounting structures for the hydraulic cylinder that can provide the strength necessary to support the cylinder loads and/or accommodate the stresses that occur during the loading and unloading (or dumping) of a roll-off.

Still another advantage of the present application is that when the hydraulic cylinder is in the travel position, the hydraulic cylinder rides vertically forward of the load on the roll-off trailer.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

Figure 1:
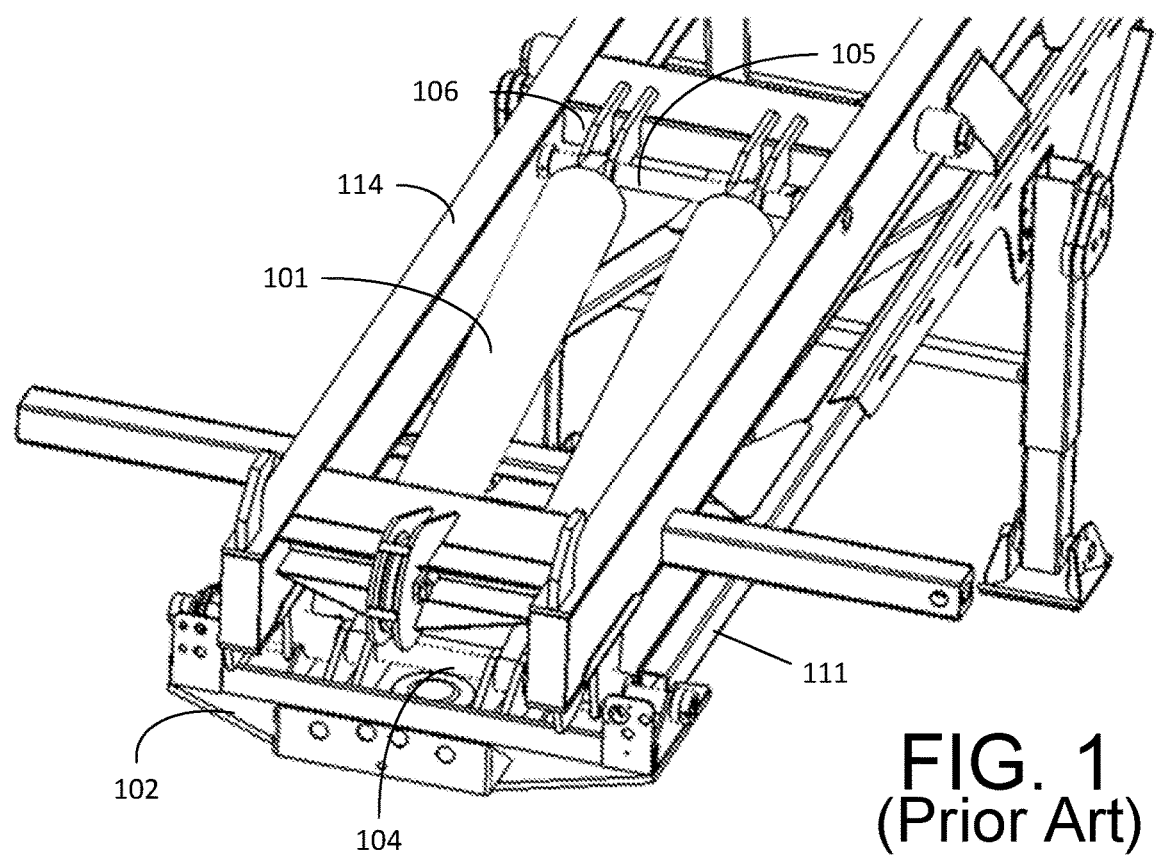
FIG. 1 shows a partial perspective view of an end of a prior roll-off trailer.
Figure 2:
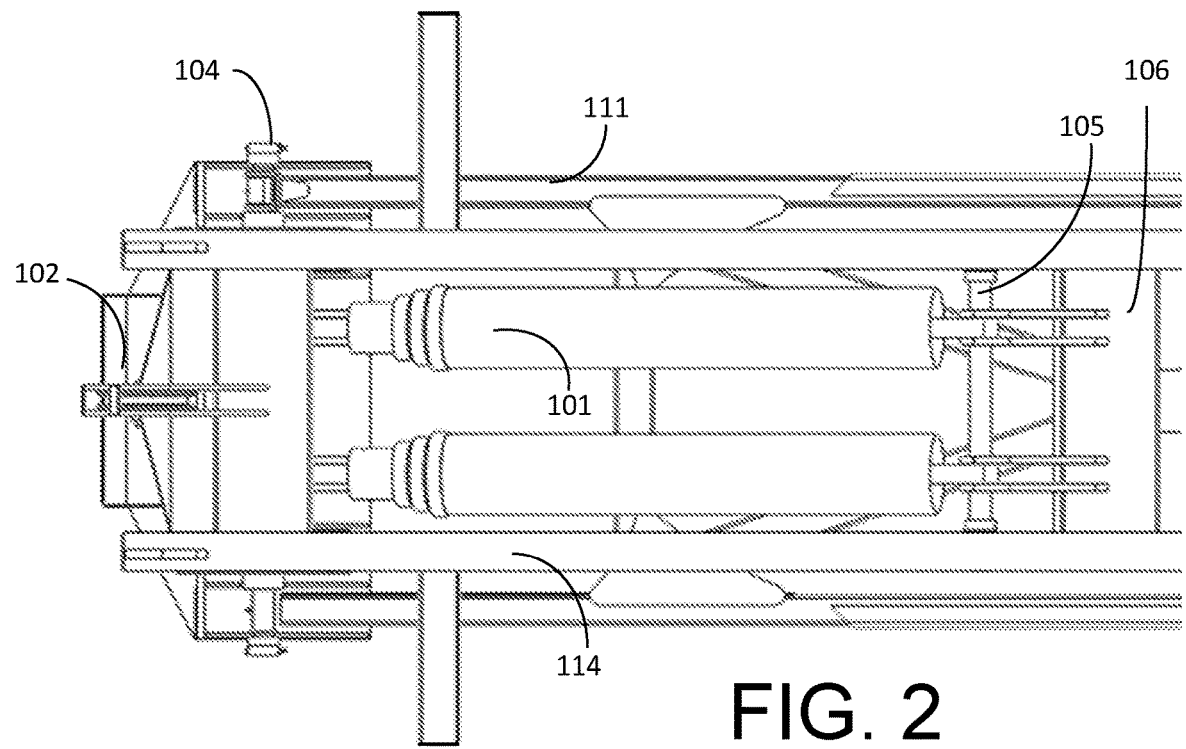
FIG. 2 shows a partial top view of the end of the prior roll-off trailer from FIG. 1.
Figure 3:
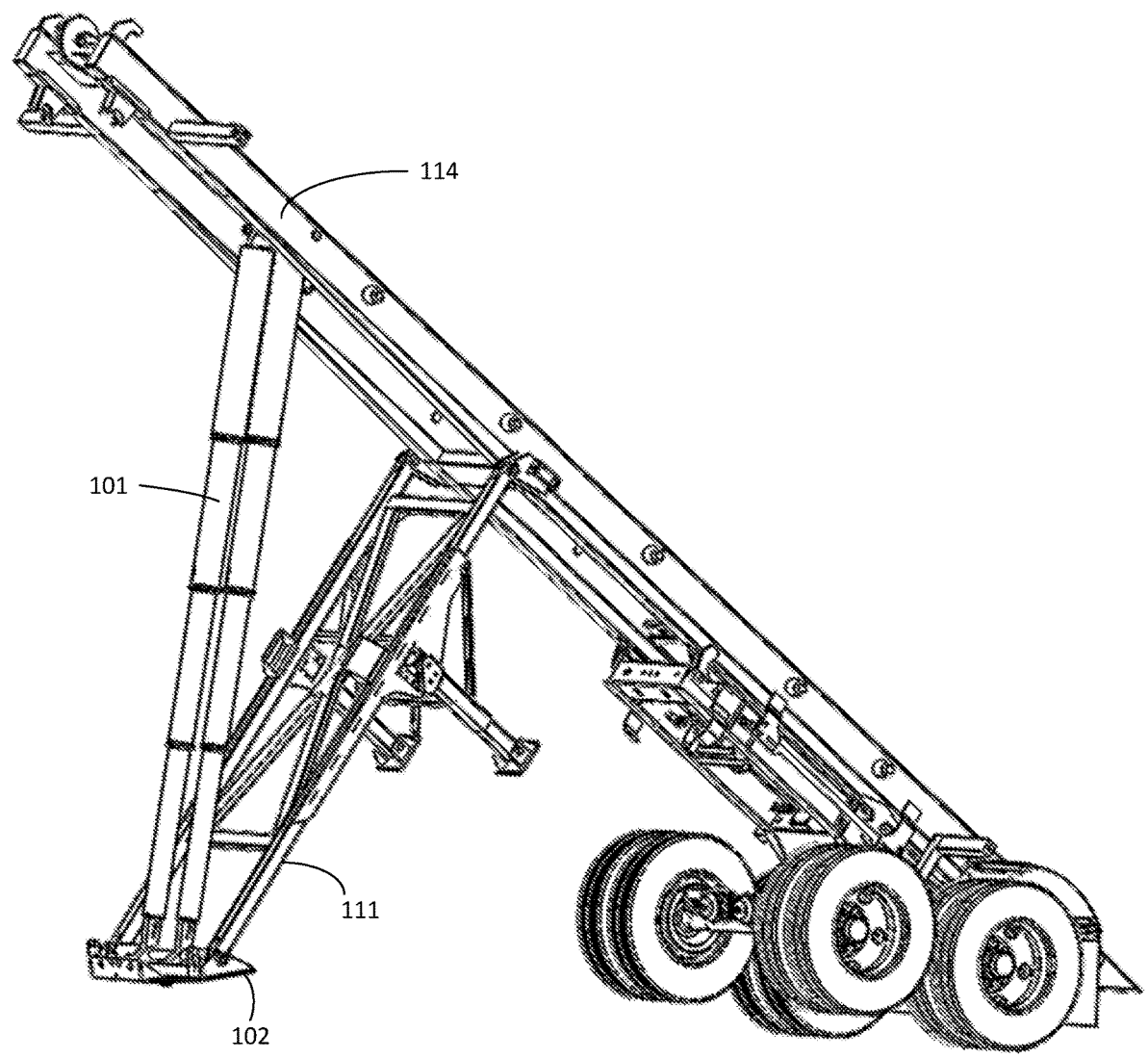
FIG. 3 shows a perspective view of a prior roll-off trailer in a loading/unloading position.
Figure 4:
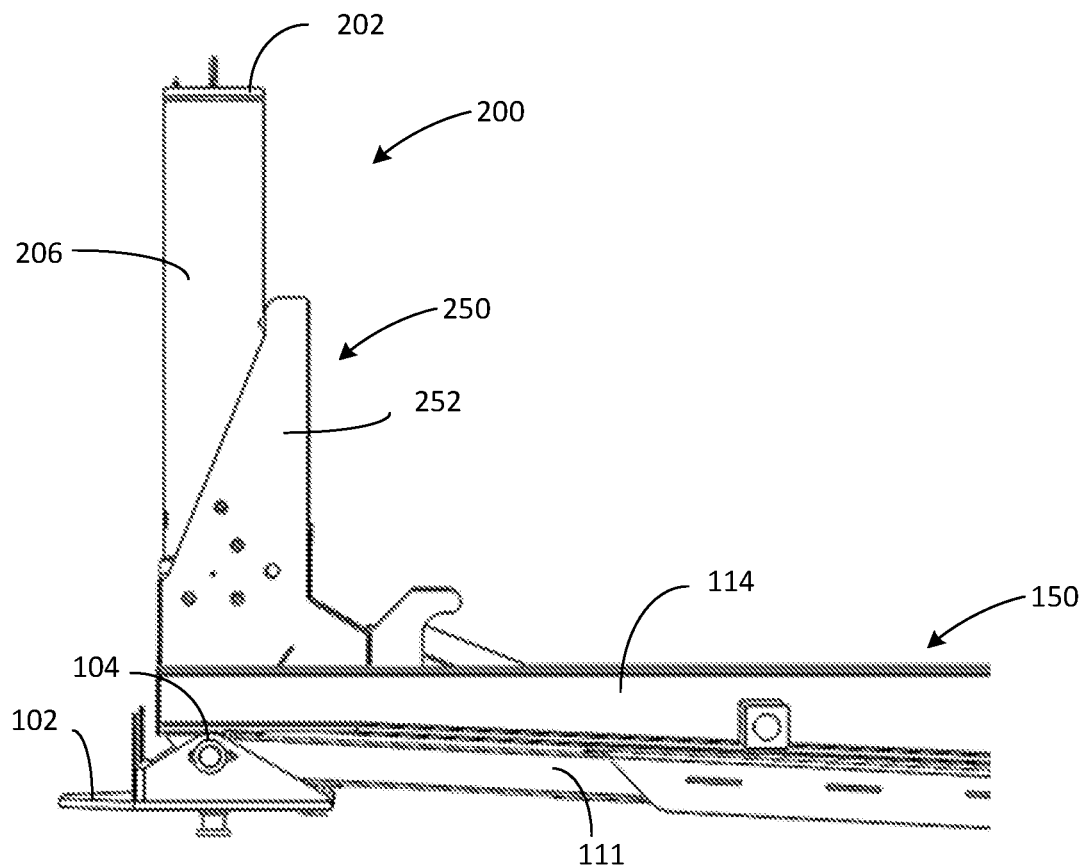
FIG. 4 is a partial side view of a roll-off trailer with an embodiment of the hydraulic lift system.
Figure 5:
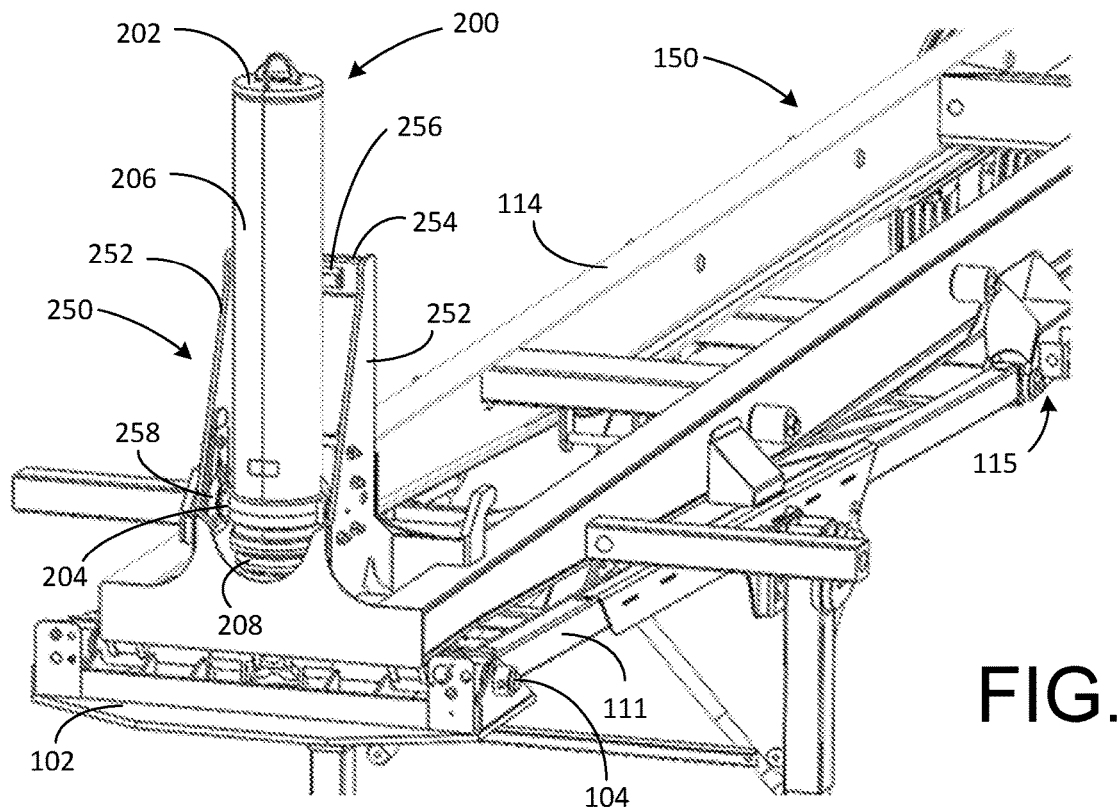
FIG. 5 is a partial perspective view of a roll-off trailer with an embodiment of the hydraulic lift system.
Figure 6:
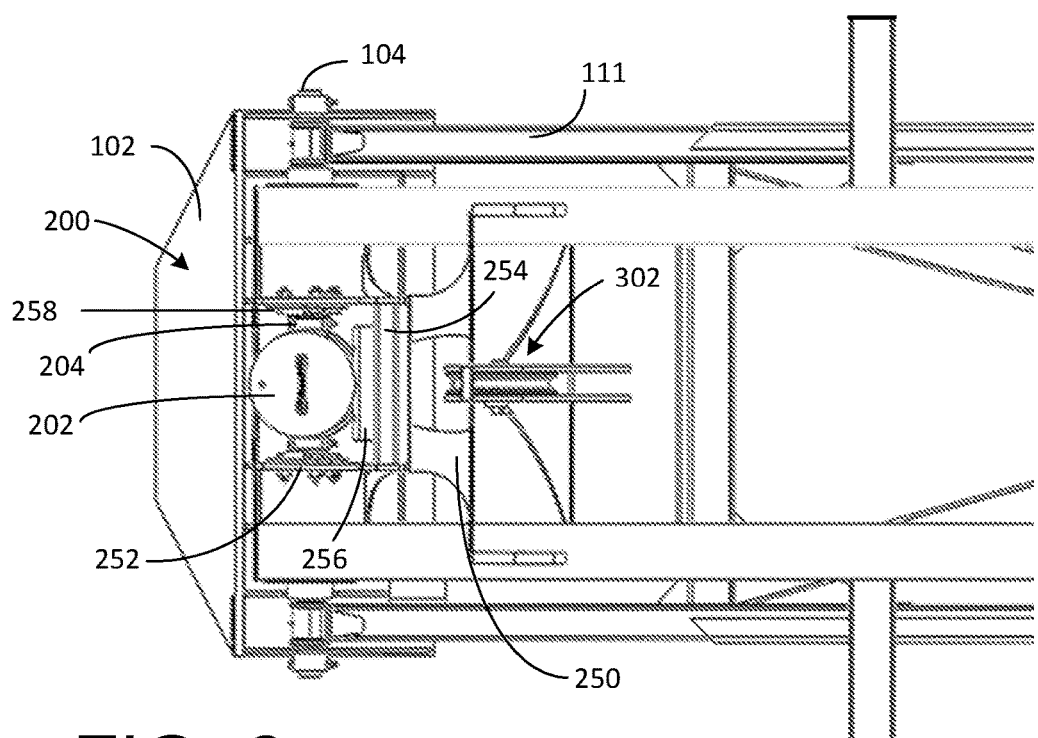
FIG. 6 is a partial top view of a roll-off trailer with an embodiment of the hydraulic lift system.

FIGS. 4-6 show an embodiment of a hydraulic lift system for a semi-trailer such as roll-off trailer. The hydraulic lift system 200 can include a hydraulic cylinder 202 mounted in a cylinder mounting structure 250. The cylinder mounting structure 250 can be mounted on or fastened to the longitudinal members or beams 114 of the roll-off trailer 150. The cylinder mounting structure 250 can be fastened to the longitudinal beams 114 by any suitable technique (e.g., welding or bolting) that can withstand the forces applied by the hydraulic cylinder 202 when moving the longitudinal beams 114 of the roll-off trailer 150 between a load/unload or dump position and a travel or relaxed position. When the hydraulic cylinder 202 is mounted in the cylinder mounting structure 250, the hydraulic cylinder 202 can have a substantially vertical (semi-vertical) or substantially perpendicular orientation. In other words, the cylinder mounting structure 250 positions the longitudinal axis of the hydraulic cylinder 202 at an angle between 85° and 95° relative to the longitudinal beams 114.

The cylinder mounting structure 250 can include a pair of vertical plate members 252 that can be fastened to and extend from the longitudinal beams 114. The hydraulic cylinder 202 can be positioned between the vertical plate members 252. The upper ends of the vertical plate members 252 (i.e., the ends of the vertical plate members 252 opposite the longitudinal beams 114) can be connected by a cross-member 254 that can provide support and rigidity to the vertical plate members 252. The cross-member 254 can be connected at the "rear" of the vertical plate members 252 such that the cross-member 254 is located between the hydraulic cylinder 202 and a roll-off or container box when the roll-off or container box is loaded on the roll-off trailer 150. The cross-member 254 can include a padded area 256 on the side of the cross-member 254 facing the hydraulic cylinder 202. The padded area 256 can include any resilient material (e.g., rubber) that can absorb impacts and prevent damage to the hydraulic cylinder 202 or the cross-member 254.

The hydraulic cylinder 202 can be connected to the cylinder mounting structure 250 with a trunnion-style connection that permits the hydraulic cylinder 202 to pivot relative to the cylinder mounting structure 250. The hydraulic cylinder 202 can be connected to the cylinder mounting structure 250 by two rods (or pins) 204 that engage with bearings 258 of the cylinder mounting structure 250. The rods 204 are diametrically opposed and can be attached to the housing 206 of the hydraulic cylinder 202 at the rod end of the hydraulic cylinder 202. The rods 204 are connected to and engage with bearings 258 of the cylinder mounting structure 250 to permit relative motion (e.g., pivoting) between the hydraulic cylinder 202 and the cylinder mounting structure 250. In one embodiment, the bearings 258 can be cast, greaseable bearings, but any suitable type of bearing can be used in other embodiments. Each bearing 258 can be connected to an inner portion of a corresponding vertical plate member 252 (i.e., the side of the vertical plate member 252 facing the hydraulic cylinder 202) by any suitable connection technique. In one embodiment, the bearings 258 can be bolted to the vertical plate members 252.

The hydraulic cylinder 202 can include a telescoping rod 208 that can be connected to the kingpin plate 102. The kingpin plate 102 can include a corresponding kingpin that engages with the fifth-wheel connection of the tractor or truck (not shown in FIGS. 4-12) used to move the roll-off trailer 150. The telescoping rod 208 can be connected to the kingpin plate 102 with cross-shaft (or cross-pin) 104. In an embodiment, the telescoping rod 208 can be connected to the kingpin plate 102 in an area of the kingpin plate 102 corresponding to the location of the kingpin (which would be on the opposite side of the kingpin plate). In addition to connecting the telescoping rod 208 to the kingpin plate 102, the cross-shaft 104 can also be used to connect the draft arms 111 of the roll-off trailer 150 to the kingpin plate 102 (and the telescoping rod 208). In one embodiment, the cross-shaft 104 can be a single pin that extends between the two draft arms 111 of the roll-off trailer 150. The other ends of the draft arms 111 can be connected to the longitudinal beams 114 of the roll-off trailer 150 at a point approximate to the mid-point of the longitudinal beams 114. In one embodiment, the draft arms 111 can be connected to the longitudinal beams 114 by a pinned connection 115.

Figure 7:
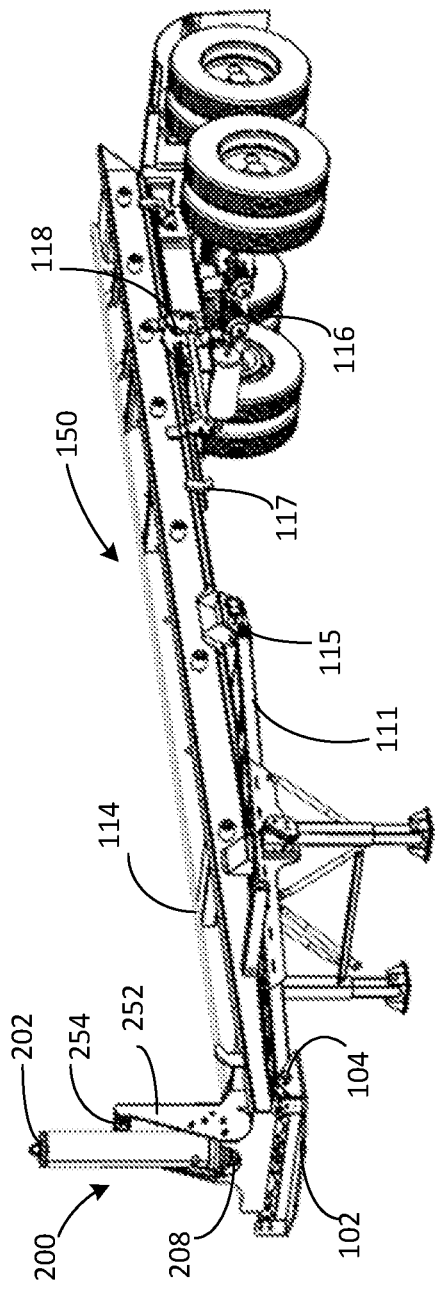
FIG. 7 is a perspective view of a roll-off trailer with an embodiment of the hydraulic lift system in the travel position.
Figure 8:
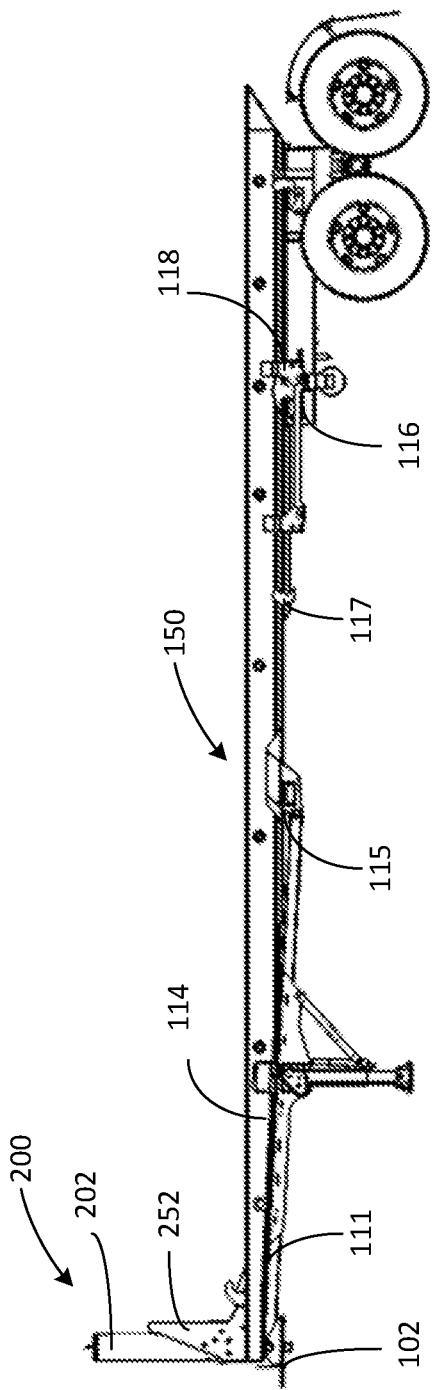
FIG. 8 is a side view of a roll-off trailer with an embodiment of the hydraulic lift system in the travel position.
Figure 9:
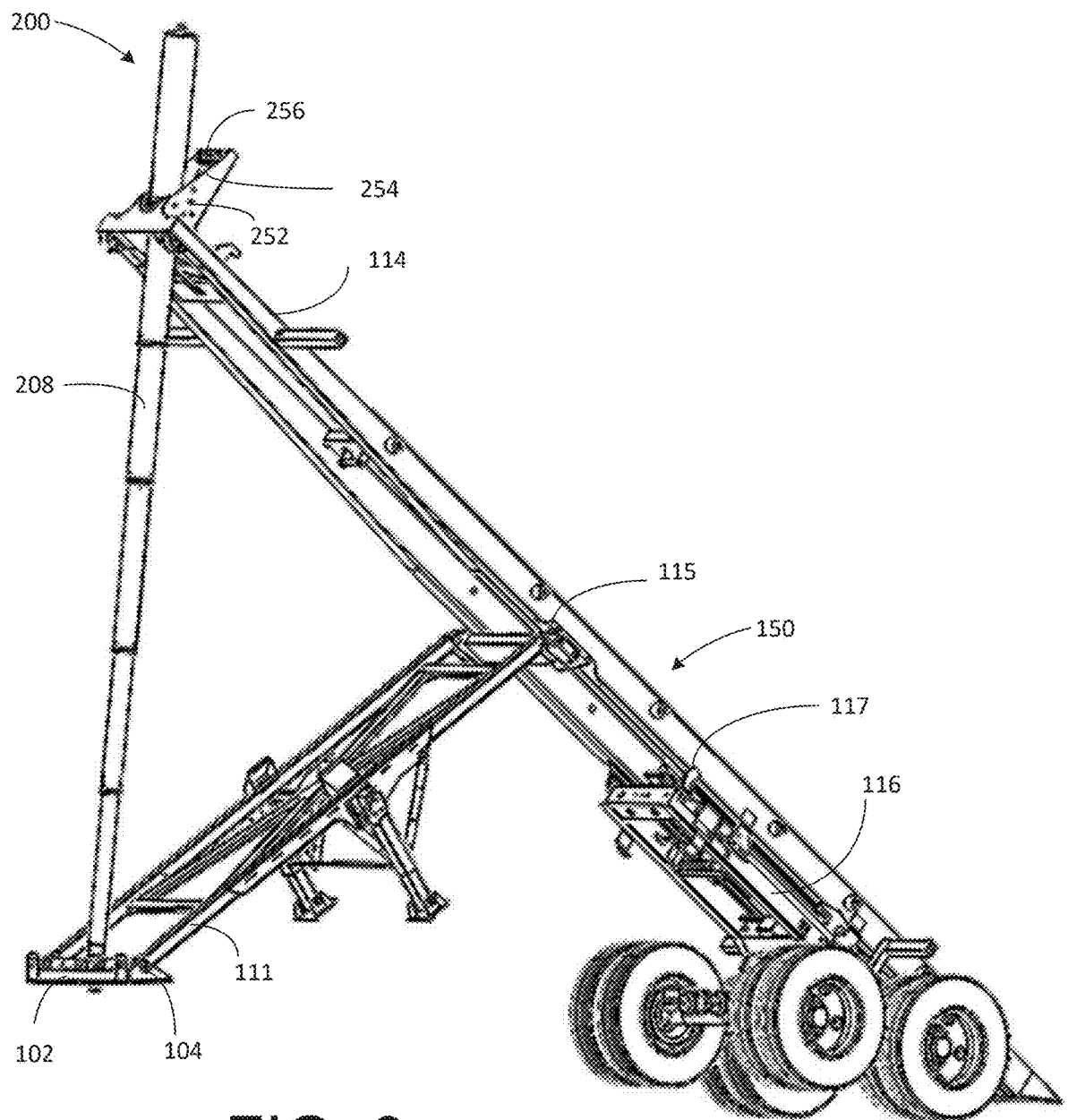
FIG. 9 is a perspective view of a roll-off trailer with an embodiment of the hydraulic lift system in the load/unload position.
Figure 10:
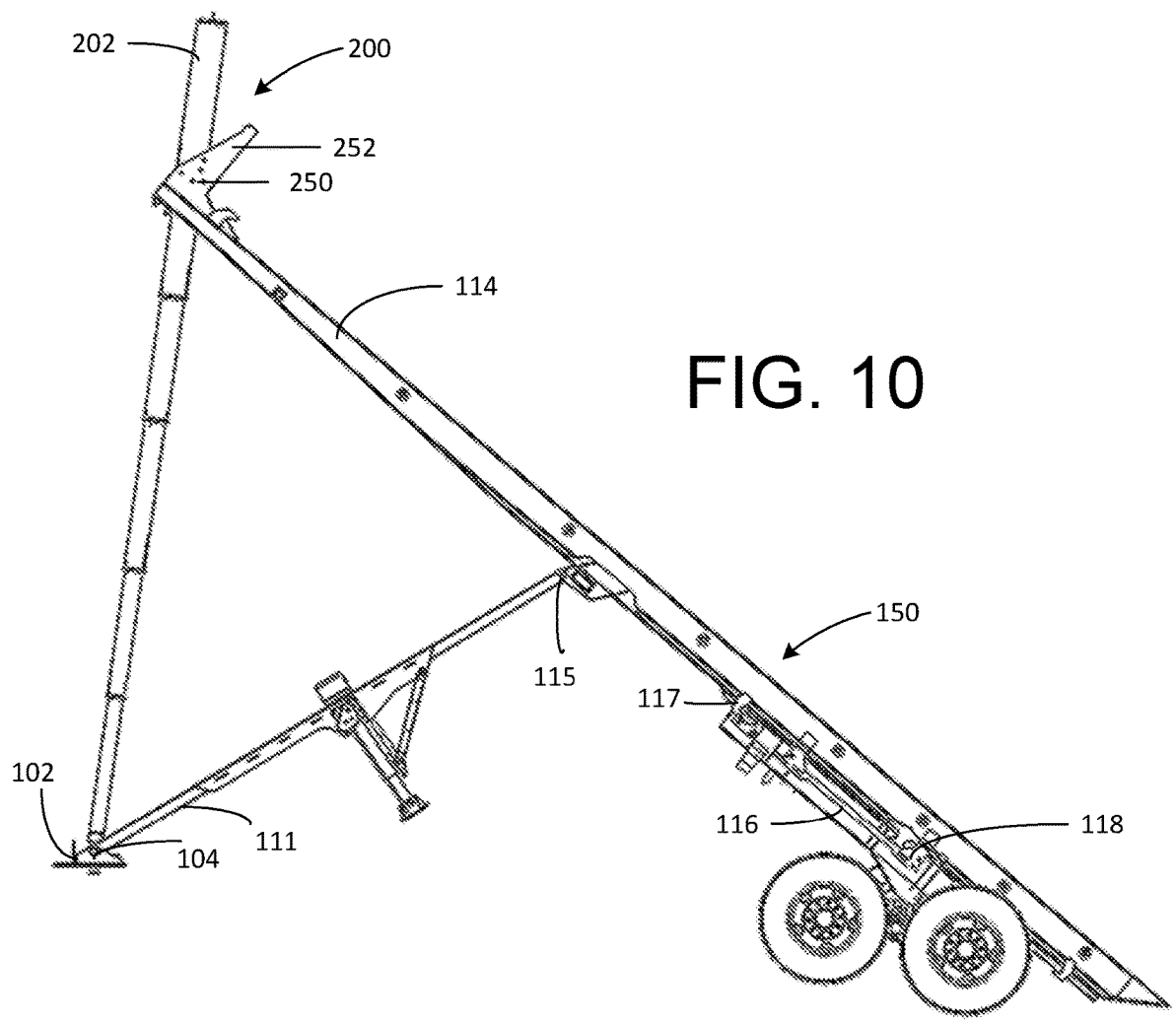
FIG. 10 is a side view of a roll-off trailer with an embodiment of the hydraulic lift system in the load/unload position.

FIGS. 7 and 8 show the hydraulic lift system 200 for the roll-off trailer 150 in the relaxed or travel position. When the hydraulic lift system 200 is in the travel position, the hydraulic cylinder 202 is in a compacted or contracted position (i.e., the distance between the base end and the rod end is at a minimum) and hydraulic pressure is not being applied to the hydraulic cylinder 202. FIGS. 9 and 10 show the hydraulic lift system 200 for the roll-off trailer 150 in the load/unload or dump position. When the hydraulic lift system 200 is in the load/unload position, the hydraulic cylinder 202 is in an extended position (i.e., the distance between the base end and the rod end is at a maximum) and hydraulic pressure is being applied to the hydraulic cylinder 202.

The hydraulic lift system 200 can be transitioned from the travel position to the load/unload position through the application of hydraulic pressure or force (e.g., from a hydraulic fluid) to the hydraulic cylinder 202. The hydraulic pressure can be provided to the hydraulic cylinder 202 from a hydraulic power source on the tractor or truck used to move the roll-off trailer 150. The hydraulic pressure is forced from the hydraulic power source through a high pressure, hydraulic hose to a control valve port of a hydraulic control valve (not shown) that can be mounted on forward side of kingpin plate 102 (i.e., the side of the kingpin plate 102 near the tractor or truck). From the hydraulic control valve, two hoses (not shown) are connected between cylinder ports of the control valve and the hydraulic cylinder 202. One hose is connected to the hydraulic cylinder 202 to provide hydraulic pressure to the lower end (i.e., the rod end) of the hydraulic cylinder 202 to raise, lift or extend (lift) the hydraulic cylinder 202. The second hose is connected to the hydraulic cylinder 202 to provide hydraulic pressure to the upper end (i.e., the base end) of the hydraulic cylinder 202 to lower or contract the hydraulic cylinder 202. The two hoses can be connected to the hydraulic cylinder 202 at any suitable location that permits the hydraulic pressure to reach the appropriate end of the hydraulic cylinder.

An operator of the tractor or truck can control the control valve to direct the hydraulic pressure to the appropriate end of the hydraulic cylinder to accomplish a desired result. For example, the control valve can be moved to a first position to force hydraulic pressure to the lower end of the hydraulic cylinder 202 to extend the hydraulic cylinder 202 (i.e., move the base end of the cylinder away from the rod end of the cylinder) and separate the longitudinal beams 114 from the kingpin plate 102. As the hydraulic cylinder 202 is extended, the draft arms 111 that are pinned between the kingpin plate 102 and the midpoint of the longitudinal beams 114 to help keep the longitudinal beams 114 (and any roll-off positioned thereon) parallel and connected with the tractor or truck. The hydraulic force through the lower end of the hydraulic cylinder 202 extends and lifts the longitudinal beams 114 (and any roll-off thereon) until the hydraulic cylinder 202 is in a load/unload or dump position. After completing any loading, unloading or dumping of a roll-off when in the load/unload or dump position, the operator can then switch or move the control valve to a second position to force hydraulic pressure to the upper end of the hydraulic cylinder 202 to contract the hydraulic cylinder 202 (i.e., move the base end of the cylinder toward the rod end of the cylinder) and lower the longitudinal beams 114 (and any roll-off thereon) back to the kingpin plate 102 and the travel position.

To assist with the loading and unloading of roll-offs or container boxes, the roll-off trailer 150 can also include a hydraulic powered winch 302 (see FIG. 6). The winch 302 operates by lifting or pulling out a cable to alter the strength of the cable in order to move heavy loads such as roll-offs or container boxes. The winch 302 can be connected to the control valve by two high-pressure, hydraulic hoses (not shown) that provide hydraulic pressure to the winch 302 from the control valve. The winch 302 can have a two directional motor powered by the two hoses. One hose can cause the motor to rotate in a first direction for line pull (or cable pull) to pull a roll-off or container box up off the ground onto the roll-off trailer 150. The second hose can cause the motor to rotate in a second direction opposite the first direction for line feed (or cable feed) to lower a roll-off or container box to the ground from the roll-off trailer 150.

As shown in FIGS. 7-12, the roll-off trailer 150 can also include a sliding pedestal 116 at the rear of the roll-off trailer 150 to facilitate the loading, unloading and dumping of roll-offs and container boxes. The sliding pedestal 116 can be connected to the longitudinal beams 114 such that the sliding pedestal 116 and the longitudinal beams 114 can move relative to one another. The suspension and wheels at the rear of the roll-off trailer 150 can be attached to the sliding pedestal 116 and may pivot relative to the sliding pedestal 116. When the hydraulic lift system 200 is in the travel position, the sliding pedestal 116 can be moved away from the hydraulic lift system 200 into a first position such that the wheels of the roll-off trailer 150 extend past the longitudinal beams 114 as shown in FIGS. 7 and 8. In contrast, when the hydraulic lift system 200 is to be moved into the load/unload position, the sliding pedestal 116 can be moved towards the hydraulic lift system 200 into a second position before the hydraulic cylinder 202 is extended such that the longitudinal beams 114 extend past the wheels of the roll-off trailer 150 as shown in FIGS. 9-12. The placement of the longitudinal beams 114 past the wheels of the roll-off trailer 150 when the sliding pedestal is in the second position permits the longitudinal beams 114 to be rotated, as the hydraulic cylinder 202 is extended, and come into contact with the ground. The sliding pedestal 116 can be locked into either the first position or the second position with steel wedges 117 and mechanical pins 118.

Figure 11:
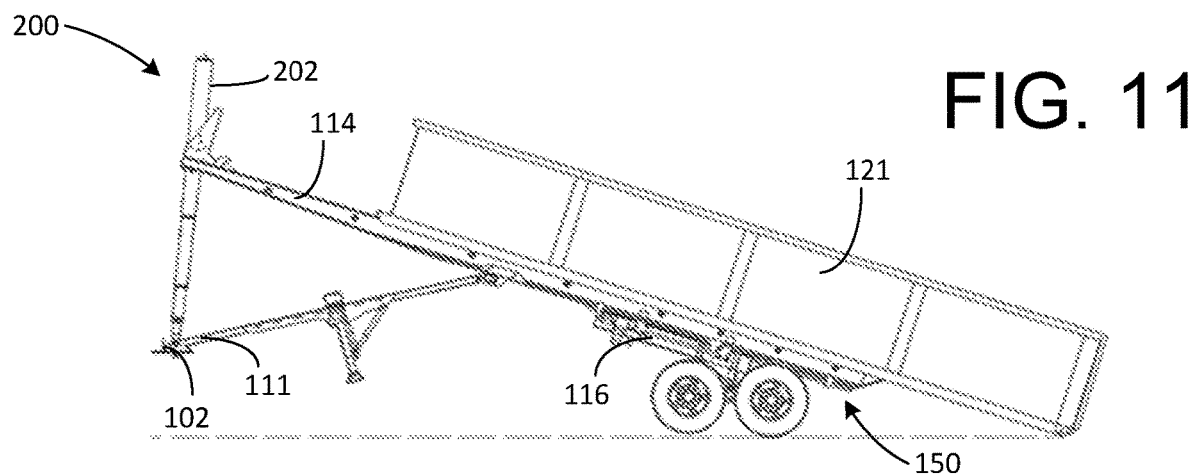
FIG. 11 is a side view of a roll-off trailer with an embodiment of the hydraulic lift system in a partially engaged position to load/unload a roll-off.
Figure 12:
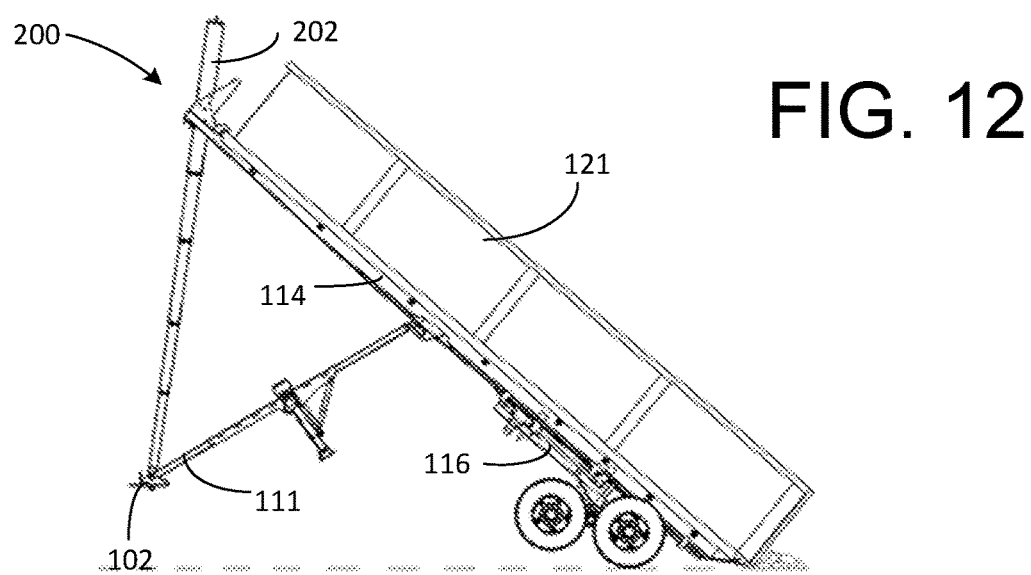
FIG. 12 is a side view of a roll-off trailer with an embodiment of the hydraulic lift system in the load/unload position to dump a roll-off.

FIG. 11 shows the roll-off trailer 150 during the loading or unloading of a roll-off 121. During the loading or unloading process, the hydraulic lift system 200 is moved into the load/unload position such that the longitudinal beams 114 are contacting or nearly contacting the ground. The winch 302 can then be operated to either pull the roll-off 121 onto the longitudinal beams 114 or to control the speed with which the roll-off 121 slides off of the longitudinal beams 114. As the roll-off 121 is loaded onto the longitudinal beams 114 or unloaded from the longitudinal beams 114, the hydraulic cylinder 202 can be lowered to a partially extended position, as shown in FIG. 11, to reduce the load on the winch 302 when loading or unloading the roll-off 121. FIG. 12 shows the hydraulic lift system 200 in the load/unload position to begin the dumping of the contents of the roll-off 121.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:
1. A hydraulic lift system for a semi-trailer comprising:
a mounting structure, the mounting structure connectable to longitudinal beams of the semi-trailer at a position adjacent to an end of a semi-trailer;
a single hydraulic cylinder mounted in the mounting structure, the hydraulic cylinder comprising a housing and a rod, wherein an end of the rod is connectable to a kingpin plate of the semi-trailer, the hydraulic cylinder having an extended position with the end of the rod positioned away from the housing and a contracted position with the end of the rod adjacent the housing; and the hydraulic cylinder having a substantially vertical position in the mounting structure upon being in the contracted position, wherein the mounting structure further comprises a pair of plates, each plate connectable to a longitudinal beam of the semi-trailer, a cross member connecting the pair of plates, and a padded area on the cross-member, the padded area configured to contact the hydraulic cylinder when the hydraulic cylinder is in the contracted position.

2. The hydraulic lift system of claim 1, wherein the mounting structure comprises a pair of bearings connected to the hydraulic cylinder to permit the hydraulic cylinder to move relative the mounting structure, each bearing being connected to a corresponding plate of the mounting structure.

3. The hydraulic lift system of claim 2, wherein the hydraulic cylinder comprises a pair diametrically opposed rods connected to the housing, each rod being connected to a corresponding bearing of the pair of bearings.

4. The hydraulic lift system of claim 2, wherein the pair of bearings permits the hydraulic cylinder to pivot relative to the mounting structure when the hydraulic cylinder is in the extended position.

5. The hydraulic lift system of claim 1, wherein the rod is a telescoping rod.

6. A semi-trailer comprising:
a trailer portion having a first end and a second end, the trailer portion comprising:
   a pair of longitudinal beams extending from the first end to the second end of the trailer portion;
   a kingpin plate positioned at the first end of the trailer portion; and
   a pair of draft arms, each draft arm connected to the kingpin plate at one end and a longitudinal beam at an opposed end; and
a hydraulic lift system connected to the trailer portion, the hydraulic lift system comprising:
   a mounting structure, the mounting structure connected to the pair of longitudinal beams at the first end of the semi-trailer;
   a single hydraulic cylinder mounted in the mounting structure, the hydraulic cylinder comprising a housing and a rod, wherein an end of the rod is connected to the kingpin plate and the pair of draft arms, the hydraulic cylinder having an extended position and a contracted position, wherein the pair of longitudinal beams at the first end of the trailer portion are moved away from the kingpin plate when the hydraulic cylinder is in the extended position and the pair of longitudinal beams at the first end of the trailer portion are adjacent to the kingpin plate when the hydraulic cylinder is in the contracted position; and the hydraulic cylinder having a substantially vertical position in the mounting structure upon being in the contracted position, wherein the mounting structure further comprises a pair of plates, each plate connectable to a longitudinal beam of the semi-trailer, a cross member connecting the pair of plates, and a padded area on the cross-member, the padded area configured to contact the hydraulic cylinder when the hydraulic cylinder is in the contracted position.

7. The semi-trailer of claim 6, wherein the mounting structure comprises a pair of bearings connected to the hydraulic cylinder to permit the hydraulic cylinder to move relative the mounting structure, each bearing being connected to a corresponding plate of the mounting structure.

8. The semi-trailer of claim 7, wherein the hydraulic cylinder comprises a pair diametrically opposed rods connected to the housing, each rod being connected to a corresponding bearing of the pair of bearings.

9. The semi-trailer of claim 8, wherein the pair of bearings permits the hydraulic cylinder to pivot relative to the mounting structure when the hydraulic cylinder is in the extended position.

10. The semi-trailer of claim 6, wherein the end of the rod is connected to the kingpin plate and the pair of draft arms by a single pin.

11. The semi-trailer of claim 6, wherein each draft arm is connected to a corresponding longitudinal beam at a midpoint area of the longitudinal beam.

12. The semi-trailer of claim 6, wherein the trailer portion further comprise a pedestal positioned at the second end of the trailer and the pair of longitudinal beams are movably connected to the pedestal.

13. The semi-trailer of claim 12, wherein the pedestal is moveable between a first position and a second position, wherein when the pedestal is in the first position the pair of longitudinal beams are rotatable to contact the ground when the hydraulic cylinder is moved to the extended position.

* * * * *